United States Patent [19]

Sutherland

[11] Patent Number: 4,622,992
[45] Date of Patent: Nov. 18, 1986

[54] REACTION CONTROL VALVE

[76] Inventor: Ivan E. Sutherland, 5139 Penton Rd., Pittsburgh, Pa. 15213

[21] Appl. No.: 458,698

[22] Filed: Jan. 17, 1983

[51] Int. Cl.$^4$ .............................................. F16K 31/12
[52] U.S. Cl. ...................... 137/504; 137/101; 137/110; 137/111; 137/497
[58] Field of Search ............ 137/504, 497, 101, 101.21, 137/519, 110, 111; 251/281; 91/165, 463

[56] References Cited

U.S. PATENT DOCUMENTS

| | | | |
|---|---|---|---|
| 1,563,378 | 12/1925 | Knauss | 137/504 X |
| 1,897,492 | 2/1933 | Ledoux | 137/497 X |
| 1,905,733 | 4/1933 | Moore | 137/101 |
| 2,440,059 | 4/1948 | Olcott et al. | 137/166 |
| 2,441,220 | 5/1948 | Dixon | 137/504 |
| 2,843,351 | 7/1958 | Griest | 137/625.11 X |
| 2,987,050 | 6/1961 | Oppenheimer et al. | 91/463 X |
| 3,407,839 | 10/1968 | Hardy | 137/389 |
| 3,454,258 | 7/1969 | Estes et al. | 251/140 |
| 3,530,880 | 9/1970 | Hune | 137/515.5 |
| 3,545,470 | 12/1970 | Paton | 137/111 |
| 3,576,454 | 4/1971 | Beach et al. | 310/16 |
| 4,203,289 | 5/1980 | Muschelknautz | 60/358 |
| 4,206,781 | 6/1980 | Salter | 137/504 |

Primary Examiner—Randall L. Green
Assistant Examiner—Allen J. Flanigan
Attorney, Agent, or Firm—Nilsson, Robbins, Dalgarn, Berliner, Carson & Wurst

[57] ABSTRACT

Forms of a reaction control valve are disclosed utilizing various control signals with linear and rotary displacement structures to balance flow reaction forces and attain desired signal-responsive positioning. Different flow passage configurations attain different degrees of damping. An embodiment of the valve functions as a flow proportioner.

8 Claims, 8 Drawing Figures

REACTION CONTROL VALVE

BACKGROUND AND SUMMARY OF THE INVENTION

Hydraulic servomechanisms have long been built that operate with high pressure fluid from constant pressure sources. Such systems usually include hydraulic servovalves that throttle the flow of high pressure fluid into and out of a hydraulic actuator. A great many hydraulic servovalves suitable for use in such constant pressure servomechanisms have been built and a great many patents have been issued on such units. Some prior-art structures in this field have, as an operating philosophy, sensed one aspect or another of mass flow to control orifice throttling. The following U.S. patents disclose structures that are somewhat exemplary of such operations: U.S. Pat. Nos. 2,440,059 (Olcott, et al.); 2,441,220 (Dixon); 2,803,261 (Carlson); 3,113,581 (Presnell); and 3,407,839 (Hardy). Other systems have utilized developed pressure differentials to control throttling orifices to attain desired fluid flows. Exemplary of such systems are those disclosed in the following U.S. Pat. Nos.: 2,160,582 (Brugma); 3,187,768 (Waterfill); 3,552,433 (Mason); and 3,943,957 (Cohan).

The conventional servovalves, as described in various of the patents cited above, and well known to those skilled in the art, normally contain metering orifices between a stationary part and a moving part. Normally, the metering orifices operate only in a slightly open configuration necessitating precision structures. Specifically, to accommodate a small flow of fluid from such a valve, the moving part is displaced a minute distance so as to open a very small orifice through which high pressure fluid slowly passes. Consequently, the design of such valves is dominated by the need to accurately control such minute motions of the mechanism. A wide variety of mechanisms have been devised to perform that function; however, precision apparatus generally is required.

Unfortunately, a hydraulic servomechanism generally must simultaneously control the flow of fluid through several metering orifices. For example, if a hydraulic actuator is to be controlled, fluid must be controlled on both sides of a piston, i.e. both going into the actuator and coming out of it. Typically, to meet the requirement for simultaneous control of multiple streams, conventional hydraulic servovalves provide several metering orifices that open and close simultaneously or in a precisely controlled sequence.

One very common arrangement for such valves involves a cylindrical slider or spool that slides within a cylindrical chamber into which it is accurately fitted. Some parts of the spool are of smaller diameter than other parts so that the larger parts, called lands, can block or unblock openings in the side of the chamber as the spool is displaced. The annular lands are made to fit very closely into the bore of the chamber in which they operate so that fluid does not leak past them. Matching the diameter of the spool to the diameter of the chamber is relatively easy and inexpensive. However, in such conventional hydraulic servovalves the width of the lands and the separations between the lands also must be precise to accurately match the spacing of the openings in the sides of the chamber that are blocked and unblocked by the lands. The lands must be accurately matched to the openings so that the edges of different lands will define precise throttling or metering orifices in cooperation with the edges of the openings. The several metering orifices must operate in close synchronization. For example, it is common to require one metering orifice of the valve to close at exactly the same spool position at which another metering orifice opens. Because of the high pressure of the fluid supply, the difference in spool position between being open and closed for small flows is often much less than a thousandth of an inch. Thus, it can be appreciated that the width and separation of the lands must be very accurate indeed. Matching the width and spacing of the lands to the position and size of the openings is a manufacturing process that is by no means easy or inexpensive.

A valve with improper crossover performance may have central spool positions in which either no flow is permitted in either of two circuits, or flow is permitted in both of two circuits. Small inaccuracies in the position or width of the lands in a servospool valve will cause the valve to have poor "crossover" performance. In either case, the performance of the servomechanism of which the valve is a part will be seriously degraded if the crossover performance is poor. The crossover performance of conventional valves tends to drop as the precision of the parts in such valves wear, as with use.

Recapitulating to some extent, precision manufacture is required in conventional hydraulic servovalves because they control small flows of high pressure fluid. The desired flow is established by tiny motions between two parts to open a tiny gap at a metering orifice. Conventional valves have no means to measure the actual flow obtained, nor in general, does the actual flow obtained have any direct effect on the valve's performance. Traditional valves control the flow of fluid only indirectly by establishing the size of the opening in the metering orifice. However, the viscosity of the fluid, the pressure and other factors affect the actual flow rate obtained.

In general, the present invention is directed to a reaction control servovalve in which the rate of fluid flow is controlled directly. According to the invention, the metering orifice or orifices are opened or closed to balance two forces, one of which is a reaction force generated directly by the mass flow of the fluid being controlled. The other force may be any of a variety of external control forces.

Because a reaction force derived from the mass flow of the fluid is used directly to control the metering orifices, the desired flow rate is obtained somewhat independently of the accuracy with which the mechanism is made and substantially independently of fluid viscosity, fluid pressure or wear in the parts of the valve. As illustrated by the embodiments disclosed herein, the servomechanism system of the present invention uses reaction control valves. Also, because the system described utilizes the difference between two flows to drive an actuator, its valves can operate mostly open rather than nearly closed. Accordingly, the valves can be constructed with less precision and concurrently be less subject to wear than conventional servovalves.

DESCRIPTION OF THE PREFERRED EMBODIMENTS

Figure 1:
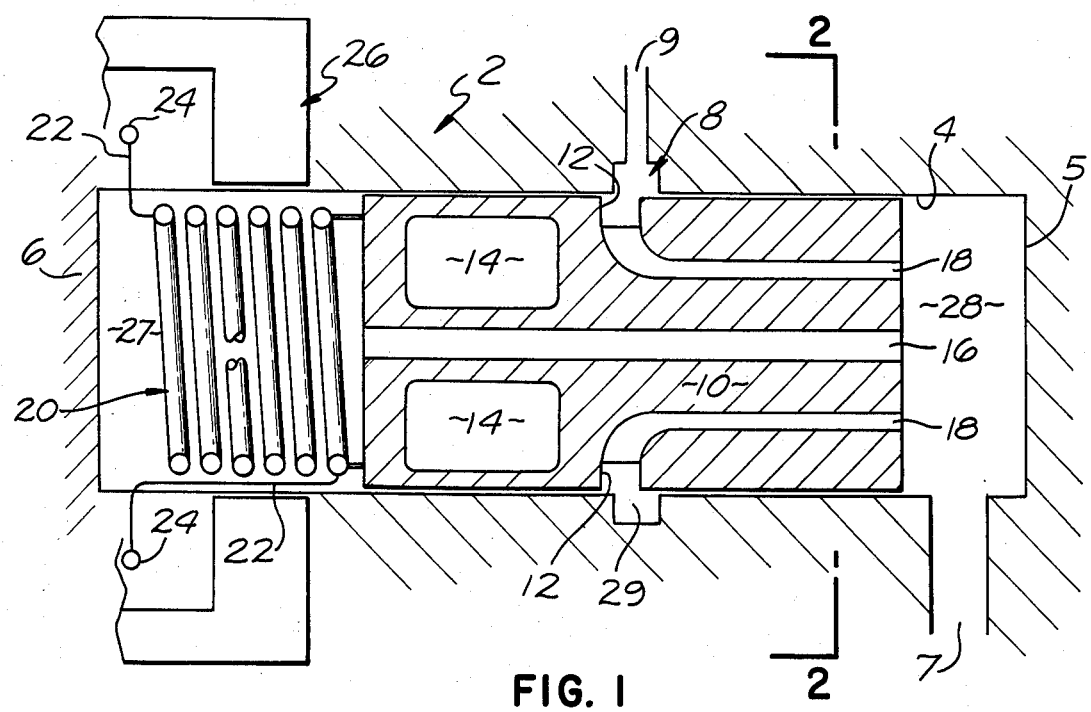
FIG. 1 is a longitudinal sectional view taken through a rather simple embodiment of the present invention in the form of a linear single circuit reaction control valve with electric drive.
Figure 2:
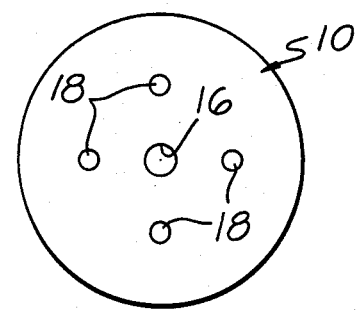
FIG. 2 is a sectional view taken along line 2—2 of FIG. 1.

Referring first to FIGS. 1 and 2, a simple flow control valve is illustrated for explaining certain operations. The structure includes a stationary casing or housing 2 defining a cylindrical bore 4 which is closed by end caps 5 and 6. Functionally, the valve receives fluid from a source (not shown) to provide a controlled stream in accordance with an applied electrical signal. The cylindrical bore 4 receives fluid and is connected to an output port 7 (lower right) for discharge of a controlled stream of fluid.

A central annular groove or opening 8 is defined in the housing 2 at a mid-location in the bore 4 and is connected to an input port 9 for receiving fluid from a source. The bore 4 matingly contains a movable slider or hollow spool 10 defining a central annular groove 12. The spool also defines an annular closed chamber 14 and passages 16 and 18. The passage 16 (FIG. 2) extends axially through the center of the spool 10. The passages 18 are offset from the central axis in spaced quadrature, and at a mid-location of the spool 10 turn to extend radially into the groove 12.

Connected to the movable hollow spool 10 is an electric coil 20 which lies inside the gap of a fixed magnet 26 (mounted outside the housing 2). The coil 20 is connected by flexible electrical wires 22 that extend out of the housing 2 to terminals 24.

Considering the spool 10 in somewhat greater detail, the chamber 14 is an annular hollow space that is filled with air and sealed closed. The passage 16 is a through passage extending completely through the spool 10 to connect the two ends of the spool 10 so that fluid can flow freely from one end space 27 (left) of the chamber 4 to the other end space 28 (right). Pressures are thus balanced. The passages 18 each include a ninety degree turn and terminate at the groove 12 so that fluid entering groove 12 can flow through the passages 18 to the right end space 28 of the bore 4 adjacent the discharge port 7.

To consider the operation of the valve of FIG. 1, certain fluid streams will be assumed. Fluid received through the input port 9 passes into the spool 10 at the groove 12, and then moves into the spool 10 radially, turning to pass axially through the passages 18. As the fluid passes between annular opening 8 and annular groove 12 it flows radially inward. When the fluid leaves the passages 18, it is flowing axially. To change its direction of flow through the spool 10, the fluid must accelerate. That acceleration of the fluid produces a reaction force on the spool 10 urging the spool 10 to move to the left. Were the spool 10 to move sufficiently to the left, the metering passage 29 (defined between the stationary annular opening 8 and the moving annular groove 12) would close, and fluid would cease to flow.

Considering now the operations relative to the coil 20 and the permanent magnet 26, when a controlled electrical current flows in the coil 20 it introduces a control force on the spool 10 tending to move the spool to the right. As the spool moves to the right, the metering passage 29, between the stationary opening 8 and the movable groove 12, enlarges and more fluid may flow through the passages 18. But, as indicated above, when more fluid flows, it hydraulically produces a larger reaction force tending to close the annular metering passage 29. In fact, during operation, the spool will assume a position in which the flow of fluid through passages 18 is exactly the flow required to produce a reaction force equal to the control force generated by the electrical current in the coil 20 acting in the field of the magnet 26.

It is possible, of course, to produce the applied control force in any of a number of ways. Were the spool appropriately weighted and mounted vertically with the passages 18 pointing downward, gravity would produce a force on the moving spool. Thus, in the absence of other forces, a flow would be permitted through the passages 18 not greater than that flow which produces just enough force to support the weight of the moving spool. Alternatively, one could produce the control force with a spring, with a separate hydraulic or pneumatic actuator, or by any one of a wide variety of means that will be obvious to those skilled in the art.

Consider now the hollow chamber 14 defined in the spool 10. The purpose of the chamber 14 is to render the valve insensitive to gravity or other acceleration of the valve such as with vibration. The hollow chamber in the moving spool is provided with the design objective that it is of such a size that the weight of the spool is identical to that of an equal volume of the working fluid, i.e. neutral buoyancy. Were the idealized spool 10 to be removed from the valve and placed in a pool of the working fluid, it would neither float nor sink. Because of the hollow chamber 14, the idealized weight of the spool is adjusted to have the same average density as the working fluid and therefore is not subject to forces due to vibration of the valve, acceleration of the valve, or gravity.

Thus, an apparatus is illustrated for effectively controlling a fluid stream (from outlet port 7) in accordance with an electrical signal (current in the coil 20). The force applied to the spool 10 by the coil 20 varies as the electrical current through the coil 20. That force, related to the signal level applied to the terminals 24, urges the spool 10 to the right. Accordingly, the spool 10 is displaced to the right until an equilibrium position is attained. Specifically, movement of the spool 10 to the right opens the annular passage 29 allowing a greater fluid flow. The increased flow at the passage 12 produces an increased acceleration reaction force urging the spool 10 to the left. Accordingly, a balance is attained between the forces with the flow rate of the fluid stream from the port 7 reflecting the amplitude of the applied electrical signal.

Figure 3:
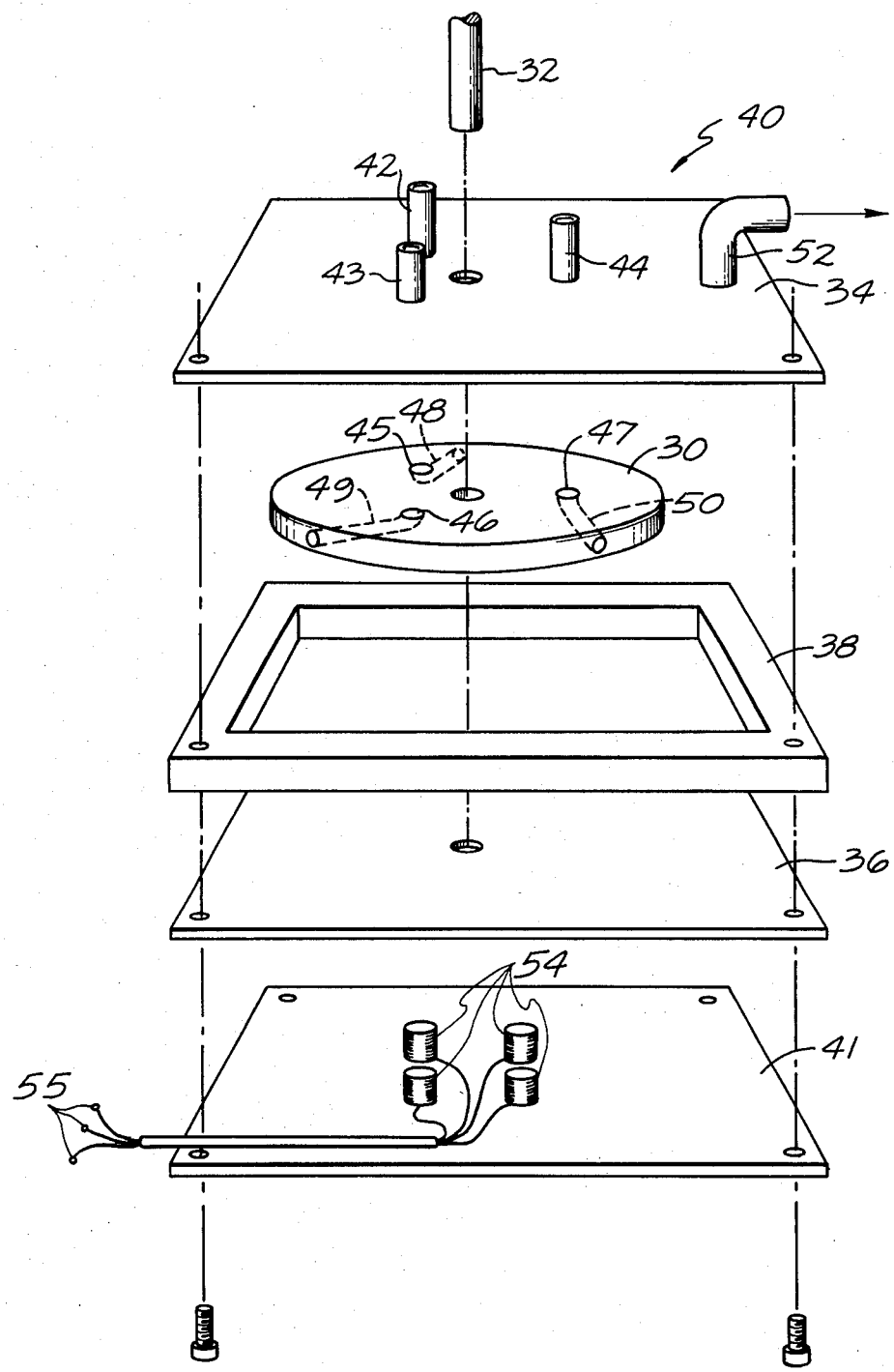
FIG. 3 is an exploded view of another form of a single circuit reaction control valve in a disk configuration utilizing rotary motion to control metering orifices.

Reference will now be made to FIG. 3 which shows another form of basic flow control valve. In this form, the moving element is a disk 30 which is mounted to rotate about its central axis on a shaft 32. The disk 30 functions somewhat as the spool 10 that moves linearly in the embodiment of FIGS. 1 and 2. The disk 30, of motor material, e.g. electrically conductive copper, is rotatively mounted in a housing including electrically passive side plates 34 and 36 attached to an open rectangular frame 38 of similar material. These components could be of a synthetic, electrically insulating material. Both plates support the shaft 32. Additionally, the upper plate 34 supports hydraulic apparatus 40 while the lower plate 36 receives an electrical mounting chassis 41.

The upper plate 34 defines three inlet ports which receive ducts 42, 43, and 44 and are in approximate alignment with side ports 45, 46, and 47 respectively in the disk 30. The ports 45, 46, and 47 penetrate the disk 30 only to reach one of three somewhat radial force passages 48, 49, and 50 respectively. Accordingly, fluid flow is into the disk 30 along axially parallel paths, through the ports 45, 46, and 47, then out of the disk through somewhat radial passages 48, 49, and 50.

The acceleration forces of streams turning to pass through the passages 48, 49, and 50 urge the disk to revolve in a counterclockwise direction. Note that spent fluid from the passages is exhausted through the outlet passage 52 as the controlled stream.

As the disk is displaced counterclockwise, the ports 45, 46, and 47 are displaced from alignment with the ducts 42, 43, and 44 respectively, thereby tending to close the common passages (metering ports) somewhat as explained above with reference to the structure of FIGS. 1 and 2. However, as in that structure, the passages of the valve of FIG. 3 are held open as a result of balancing forces provided by coils 54 on the electrical mounting chassis 41. Specifically, the coils 54 carried on the chassis 41 are held adjacent to the plate 36 through which they act to induce electrical currents in the disk 30. In the fashion of an induction motor, these currents set up rotational forces which are balanced by the hydraulic reaction forces imparted to the disk 30. Consequently, the movable disk 30 is positioned to allow a flow rate from the outlet passage 52 that is related to the electrical signals as applied to terminals 55 to energize the coils 54.

As in the linear embodiment of FIGS. 1 and 2, the rotary embodiment of FIG. 3 may alternatively include a magnetic, hydraulic, or other mechanism to provide a control torque. As examples, the torque may be introduced by a torque motor as well known in the art, by a spring, a mechanical connection, or by other suitable means as will be appreciated by those skilled in the art.

Figure 4A:
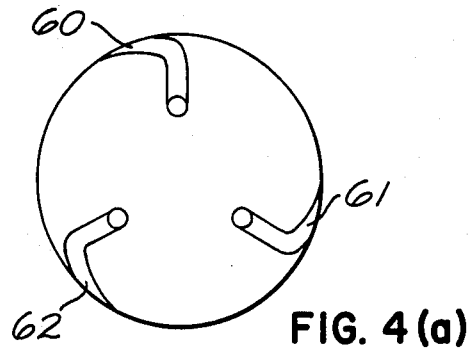
FIGS. 4(a), 4(b) and 4(c) show a series of plan views of sectioned rotary elements of the valve of FIG. 3 showing alternative embodiments.
Figure 4B:
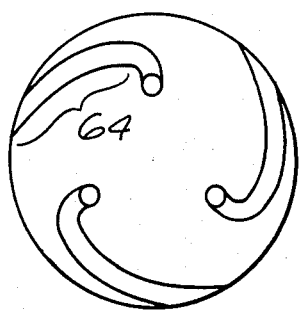
Figure 4C:
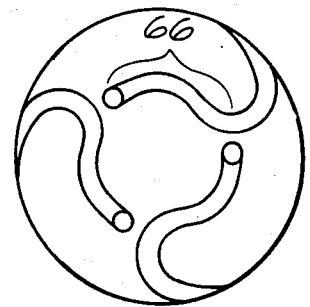

FIG. 4 shows several alternative variations for the shapes of the passages 48, 49, and 50 in the disk of the valve of FIG. 3. In moving through these passages, the fluid will generate a torque if the inlet deviates in direction from the outlet, as to change from a radial to a circumferential path with respect to the rotary moving element, e.g. disk 30. The magnitude of the reaction torque generated can be established by picking the outlet orientation of the passages. If the discharge openings are formed as the openings 60, 61, and 62 to discharge the fluid somewhat circumferentially, as illustrated in FIG. 4(a), then a meaningful torque will be produced. The differences in the shape of the passages in FIG. 4(b) and FIG. 4(c) have to do with the damping of oscillations in the valve.

Because the valve of FIG. 3 operates by balancing a control torque against a hydraulic torque (reaction to the flow of the fluid) there is a possibility that instead of reaching a stable operating point quickly and reliably, the moving element will oscillate around the stable position at which the forces or torques are balanced. The fluid in the circumferential parts of the passages, e.g. passage sections 64 and 66, provides a damping action against such oscillations. If the circumferential parts of the passages are made longer, as the passages 64 in FIG. 4(b), a greater damping action of the fluid will result. If the circumferential parts of the passages are made shorter, as in FIG. 4(a), then a lesser damping action will result. In general, the valve will respond more quickly if there is less damping, but it will be less stable. The damping can be made as small as desired, or even negative by forming passages as the serpentine bending passages 66 shown in FIG. 4(c).

The fluid in the radial parts of the passages also provides a minor damping action because of the Coriolis forces induced by its motion. This action is of less importance than that of the fluid in the circumferential parts of the passages, and can usually be ignored in practical designs.

It is to be noted that the production of disks in various forms (FIG. 4) as those illustrated may involve composite assemblies to accomplish the desired internal passages. For example, such disks may be formed by casting or milling techniques. Appreciating the possibility of a wide variety of motion techniques different materials and structures may be used. For example, the disk 30 may be of magnetic material, or to use induction current principles, the disk may be simply of conductive material, e.g. copper.

In the linear form of the valve (FIGS. 1 and 2), a damping action similar to that described above is also provided by the motion of the fluid in the axial passages 18. The amount of damping can be controlled by selecting the length of the passages and thus generally the length of the spool. Other things being equal, greater lengths for the passages 18 will provide greater damping action.

Figure 5:
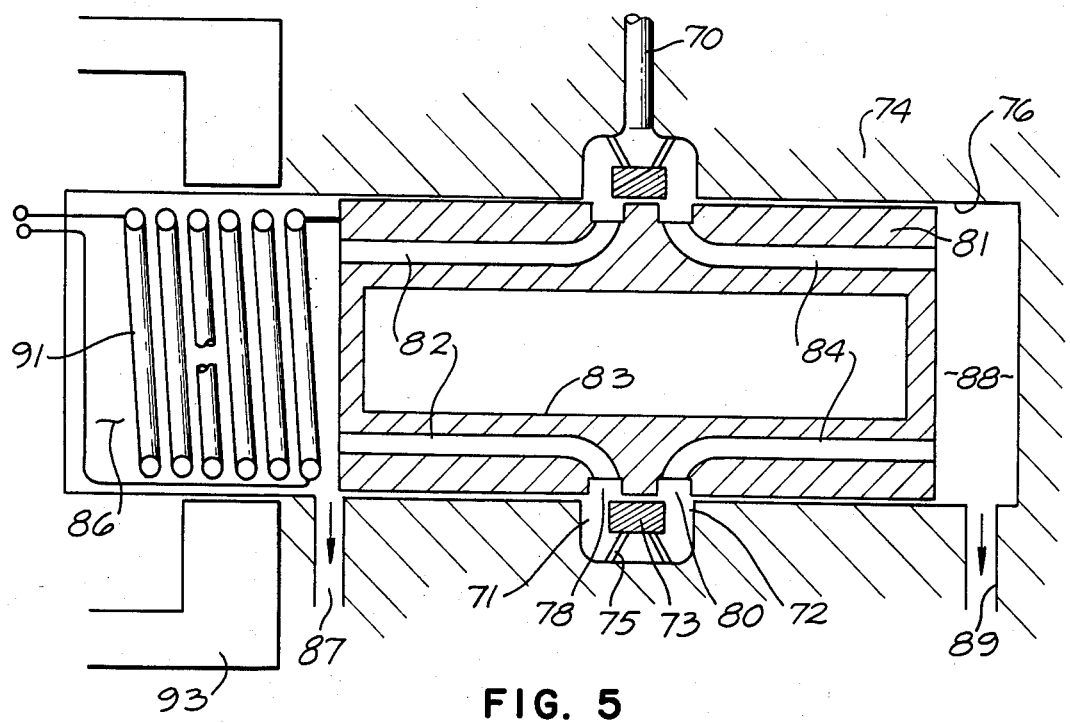
FIG. 5 is a longitudinal sectional view taken through a control valve in accordance with the present invention for the function of proportioning a fluid stream.

Referring now to FIG. 5, there is shown a flow-proportioning valve constructed in accordance with the present invention and using certain principles as described with reference to FIG. 1. One prior form of flow proportioner is disclosed in U.S. Pat. No. 3,113,581 (Presnell). As is well known in the art relative to flow proportioners, a single input stream is divided to provide, two streams of equal or predetermined unequal value (flow divider). Alternatively, streams may be merged proportionately to form a single stream (flow combiner). Different types of flow equalizers are discussed in the referenced Presnell patent.

Considering the structure of FIG. 5, an input stream port 70 supplies fluid to annular grooves 71 and 72 defined at a central location in a housing 74 which also defines a closed cylindrical operating space 76. Note that the grooves 71 and 72 are separated by a ring 73 held on rods 75. The annular grooves 71 and 72 communicate with a pair of adjacent concentric annular grooves 78 and 80 defined in a slider or spool 81 which grooves act with the grooves 71 and 72 to split the stream from the port 70. The spool 81 defines a cylindrical cavity 83 for attaining neutral buoyancy as described.

The groove 78 is tapped by passages 82 while the groove 80 is tapped by passages 84. The passages 82 incorporate a ninety-degree turn from the radial and extend to the left parallel to the axis of the spool 81. Conversely, the passages 84, after a ninety-degree turn from the radial, extend to the right out of the spool 81. The passages 82 terminate at a collection space 86 (left) in the housing 74 for an outlet 87 while the passages 84 terminate at a collection space 88 (right) for an outlet 89. Note that it is important to implement the apparatus of FIG. 5 so that pressures are not developed in the collection spaces 86 and 88 which will alter the operation of the unit as described herein. Specifically for example, the spaces 86 and 88 exhaust through passages 87 and 89 to ambient pressure with the consequence that the spaces are relieved to a common pressure.

For the present, ignore the electrical coil 91 represented in the space 86 and attached to the spool 81. The function of the coil 91 is described below; however, initially assume that it is not energized.

In operation, the port 70 delivers fluid to the passages of the moving slider or spool 81 where flow is directed towards opposite ends of the spool through the passages 82 and 84. In a manner similar to that described for the reaction control valve of FIG. 1, each stream of fluid develops a reaction force on the spool 81 that is proportional to the square of the mass flow rate of that stream. Because the two streams move in opposite directions, the net force on the spool 81 will be away from either stream that may happen to be larger. If the moving element moves in the direction of such a net force, it alters the stream division at the grooves 71 and 72 to reduce the larger flow and increase the smaller flow because the size of the metering passages at the grooves 78 and 80 would be changed. Thus, the moving element or spool 81, seeks a position at which the two forces are equal and thus in which the two separate flows or streams are equal.

In the above-referenced Presnell patent, there are described both a linear embodiment of a flow proportioner and a rotating embodiment of a flow proportioner. In the rotating embodiment, a turbine arrangement is disclosed for producing torques from the mass flow of the fluid which is functionally somewhat related to the arrangement of jets described with reference to FIGS. 2 and 3. Accordingly, it is recognized that techniques for using acceleration reaction forces to divide or combine fluid flows in fixed proportions are known in the art.

Continuing to refer to FIG. 5, consideration will now be given to the enhanced operation of the structure with the use of the electrical control mechanism in the form of the coil 91. The electrical control mechanism consists of the coil 91 and a permanent magnet 93 which may cooperate to produce another force on the moving element or spool 81 in the flow proportioner. Under action of the electrically developed control force, the input flow through the port 70 to the valve can be divided into two controllably unequal streams from the outlet 87 and 89. Alternatively, by reversing the direction of fluid flow, the two streams that combine in the valve can be controlled to provide a single disproportionate stream as desired.

Because the reaction force on the moving element or spool 81 (produced by the flow of fluid) varies as the square of the mass flow of the fluid, the net force on the spool 81 in the valve of FIG. 5 can be expressed as the difference of two squares:

$$\text{net force} = (\text{flow A})^2 - (\text{flow B})^2$$

which can be factored algebraically to give:

$$\text{net force} = (\text{flow A} + \text{flow B}) \times (\text{flow A} - \text{flow B})$$

From this equation it is evident that if the valve of FIG. 5 operates with a constant combined flow, (flow A+flow B)=constant, then the net force to be balanced by the control force (coil 91) will be proportional to the difference in the two output flows. In other words, the embodiment of the valve shown in FIG. 5 will divide a fixed input flow into two flows that differ in mass flow rate by an amount proportional to the control force that is applied electrically to the poppet 81, as by the coil 91 and magnet 93, see FIG. 5.

It is important to notice that at the intended neutral operating point of the poppet 81, it divides the flow in equal proportions. The metering orifices 78 and 80 in the valve are, in this position, generally open. Thus, there is no requirement that they be accurately made as at edges for precise control when closing. Essentially small differences in the size of the metering orifices will make no difference to the operation of the valve because the spool 81 will seek that position which is required to divide the flow properly, independent of the actual size of the metering orifices, wear in the valve, and so on.

As with embodiments described above, in the reaction control valve of FIG. 5, the control force could be provided by means other than electrically. Hydraulic pressure, pneumatic pressure, electrostatic, mechanical, acceleration, gravity or other sources of control forces could be used. For example, a valve in which the spool was heavier than the operating fluid could be controlled by tipping it so that the force of gravity tended to move the spool towards one side or the other. Those skilled in the art will recognize the opportunity to generate control forces by many means and the particular embodiment shown in FIG. 5, as well as other embodiments herein, are not intended in any way to limit the means by which control forces are applied.

Figure 6:
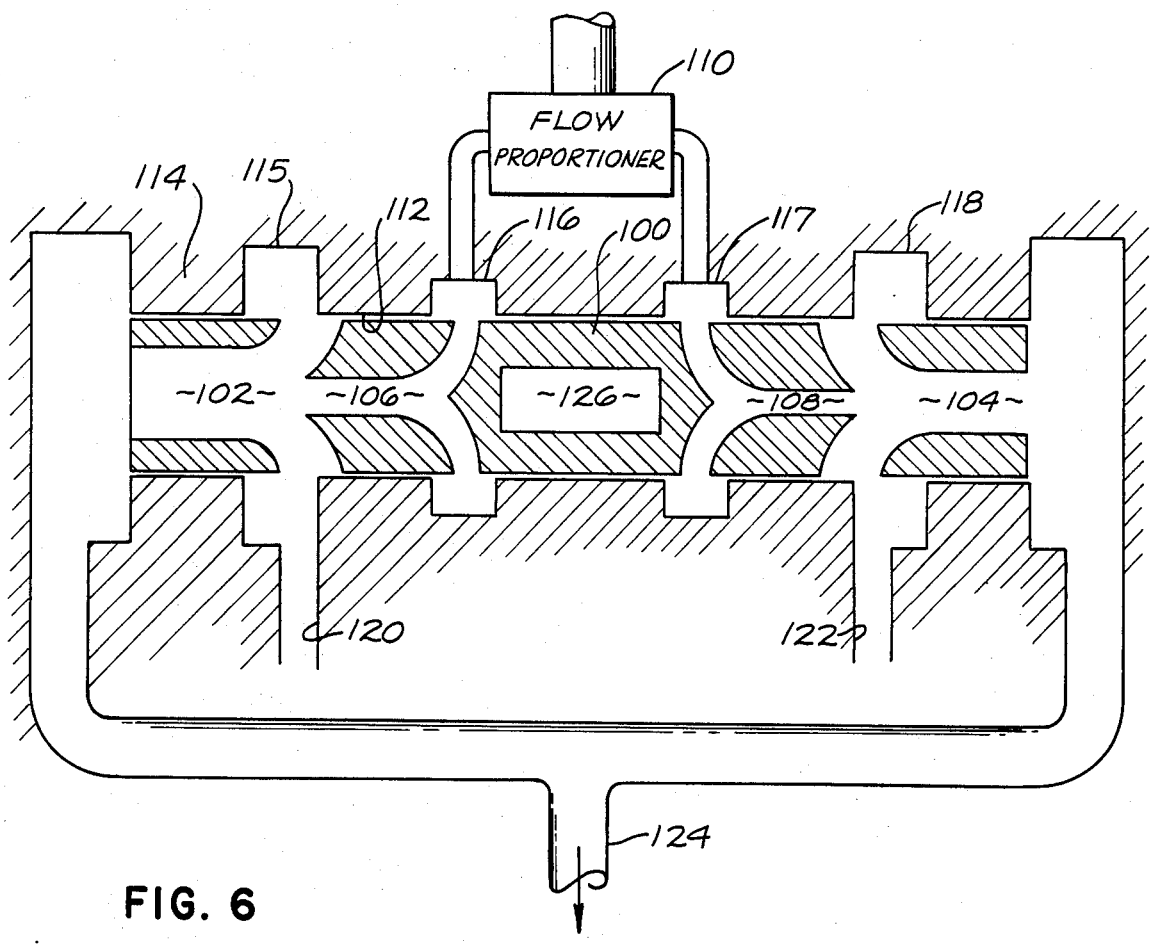
FIG. 6 is a vertical sectional view of another embodiment of the flow-proportioning valve.

A particular embodiment of the invention in which the control force is generated by another fluid stream is shown in FIG. 6. Here the moving element or slider 100 has two sets of passages, a large set, passages 102 and 104 located at the ends of the slider 100, and a small set, passages 106 and 108 located centrally. The structure of FIG. 6 might be considered as a hydraulic amplifier. The streams in the small passages 106 and 108 are controlled by a flow proportioner 110 and larger streams through the passages 102 and 104 are accordingly proportioned.

Considering the structure of FIG. 6 in detail, the cylindrical slider 100 is matingly received in a bore 112 defined in a housing 114. There are four annular indentations or grooves 115, 116, 117, and 118 in the cylindrical wall of the bore 112. However, only the grooves 115 and 118 (cooperating with the larger passages 102 and 104 respectively are operated as metering orifices. The annular grooves 116 and 117 are substantially wider than the orifices to the passages 106 and 108. As a consequence, the passages 106 and 108 are always fully open to receive fluid from the flow proportioner 110.

The annular groove 115 receives fluid from a passage 120 while the groove 118 receives fluid from a passage 122. Functionally, the structure combines the fluid streams in passages 120 and 122 to provide a total stream in an outlet passage 124 that is proportioned under the control of the proportioner 110. Essentially, control is by the streams in the smaller passages 106 and 108, which in the embodiment of FIG. 6 are proportioned by the proportioner 110. In the embodiment of FIG. 6, as in previously described embodiments, the slider 100 has a hollow interior space 126 for total density adjustment.

Considering the operation of the structure of FIG. 6, fluid flows in the smaller passages 106 and 108 induce a net control force on the moving element proportional, as we have seen, to the difference in the flows in the two smaller streams. This control force is balanced by the force generated in the larger passages 102 and 104. Thus, the embodiment of FIG. 6 shows a valve in which the relative size of two larger streams of fluid (in passages 102 and 104) is controlled to be proportional to the relative size of two smaller streams of fluid (in passages 106 and 108). Thus, the embodiment of FIG. 6 serves as a flow-controlled amplifier. Those skilled in the art may easily calculate that the amplification factor of such a valve is set by the ratio of the diameter of the discharge openings from the smaller passages 106 and 108 to the diameter of the discharge openings from the larger passages 102 and 104.

It will be readily apparent, in view of the embodiments described above, that a structural equivalent of that of FIG. 6 can be constructed in a rotary configuration with the moving element rotating rather than moving linearly. Other embodiments can be made utilizing other kinds of motion for the moving element, e.g. helical, spiral, or non-linear, as will be apparent to those skilled in the art.

It will be obvious to anyone skilled in the art that by selecting suitable sizes for the fluid flow passages one can design the relative strength of the forces produced by different flows. In general, fluid flowing through smaller passages will move faster, and therefore, have a greater effect than would an equal rate of fluid flow passing through a larger passage.

It is interesting to contrast the hydraulic servomechanism as disclosed herein with the conventional hydraulic servomechanisms now in common use. Where conventional hydraulic servomechanisms use a constant pressure source, the servomechanism disclosed here uses a constant flow source. Constant flow sources are generally less costly and mechanically simpler than constant pressure sources. Accordingly, improved forms of structures are disclosed herein and as indicated, a variety of modified forms will be apparent to those skilled in the art. Consequently, the scope hereof shall be interpreted in accordance with the claims as set forth below.

What is claimed is:

1. An apparatus for controlling fluid flow, comprising:
    a stationary element defining inlet and outlet ports for fluid flow;
    a movable element contained for movement relative to said stationary element whereby to define at least one metering orifice therewith to vary the flow of fluid therethrough, said movable element further defining at least one internal passage of a length and cross-sectional area to provide a damping effect appropriate to said reaction force to give the desired stability and sensitivity to the valve, coupled to said metering orifice such that a reaction force is provided on said movable element that is proportional to the flow rate through said metering orifice; and
    balancing means for applying a force to said movable element to attain a balance with said reaction force.

2. An apparatus for controlling fluid flow, comprising:
    a stationary element defining inlet and outlet ports for fluid flow;
    a movable element contained for movement relative to said stationary element whereby to define at least one metering orifice therewith to vary the flow of fluid therethrough, said movable element further defining at least one internal passage of a length and cross-sectional area to attain a particular sensitivity to changes in said reaction force in order to give the valve the desired response time and stability, coupled to said metering orifice such that a reaction force is provided on said movable element that is proportional to the flow rate through said metering orifice; and
    balancing means for applying a force to said movable element to attain balance with said reaction force.

3. An apparatus for controlling fluid flow, comprising:
    a stationary element defining inlet and outlet ports for fluid flow;
    a movable element contained for movement relative to said stationary element whereby to define at least one metering orifice therewith to vary the flow of fluid therethrough, said movable element further defining at least one internal passage coupled to said metering orifice such that a reaction force is provided on said movable element that is proportional to the flow rate through said metering orifice; and
    balancing means for applying a force to said movable element to attain a balance with said reaction force, said balancing means including means defining at least another metering orifice between said movable element and said stationary element and whereby said movable element further defines another passage coupled to said other metering orifice to provide another reaction force on said movable element opposed to said reaction force of said one passage.

4. An apparatus for controlling fluid flow, comprising:
    a stationary element defining inlet and outlet ports for fluid flow;
    a movable element contained for movement relative to said stationary element whereby to define at least one metering orifice therewith to vary the flow of fluid therethrough, said movable element further defining at least one internal passage coupled to said metering orifice such that a reaction force is provided on said movable element that is proportional to the flow rate through said metering orifice;
    balancing means for applying a force to said movable element to attain a balance with said reaction force; and
    force means to apply a force to said movable element to accomplish a predetermined imbalance.

5. An apparatus according to claim 4 wherein said force means comprises an electromagnetic means.

6. An apparatus for controlling fluid flow, comprising:
    a stationary element defining inlet and outlet ports for fluid flow and wherein said stationary element comprises a housing defining a cylindrical chamber;
    a movable element contained for movement relative to said stationary element and comprising a slider to move linearly in said chamber whereby to define at least one metering orifice therewith to vary the flow of fluid therethrough, said movable element further defining at least one internal passage coupled to said metering orifice such that a reaction force is provided on said movable element that is proportional to the flow rate through said metering orifice; and balancing means including an electric motor means for applying a force to said movable element responsive to an electrical signal to attain a balance with said reaction force.

7. An apparatus for controlling fluid flow, comprising:

a stationary element defining inlet and outlet ports for fluid flow; and a movable element contained in said stationary element for relative movement, and whereby variable metering passages are defined to interconnect said inlet and outlet ports of said stationary element, said passages including at least two pairs of passages to accommodate opposing fluid flows whereby to develop opposed reaction forces on said movable element and wherein one of said pairs of passages passes a substantially constant rate of flow whereby to develop a net reaction force linearly proportional to the difference in the flows through said one pair of passages and wherein a second pair of said passages accommodates a volume of flow relatively large in relation to said one pair of passages, said pair of passages further each being variable to meter reduced flow of fluid with increased reaction force.

8. An apparatus according to claim 7 further including a flow proportioner for supplying inversely variable streams of fluid to said one pair of passages.

* * * * *